United States Patent [19]
Novosel et al.

[11] 3,881,837
[45] May 6, 1975

[54] HIGH SPEED STEEL METAL CUTTING TOOL WITH INTEGRAL WORKING SURFACES SUBSTANTIALLY FREE OF CARBIDE PARTICLES

[75] Inventors: Thomas A. Novosel, East Burke; Donald O. Erskine, Lyndon Center, both of Vt.

[73] Assignee: Vermont American Corporation, Louisville, Ky.

[22] Filed: Mar. 6, 1973

[21] Appl. No.: 338,602

Related U.S. Application Data
[62] Division of Ser. No. 177,338, Sept. 2, 1971, Pat. No. 3,767,544.

[52] U.S. Cl............ 408/144; 76/108 T; 76/DIG. 11
[51] Int. Cl............................................. B23b 27/14
[58] Field of Search............ 408/144, 713; 76/108 T, 76/DIG. 11; 204/129.75, 140, 141.5, 145 R

[56] References Cited
UNITED STATES PATENTS
1,803,875  5/1931  Stoody et al.................. 76/DIG. 11
2,698,810  1/1955  Stauffer........................... 76/108 T

*Primary Examiner*—Andrew R. Juhasz
*Assistant Examiner*—Z. R. Bilinsky
*Attorney, Agent, or Firm*—Johnson, Dienner, Emrich & Wagner

[57] ABSTRACT

The subject invention relates to high speed steel metal cutting tools generally, and discloses as a specific embodiment of the invention a twist drill of high speed steel of known physical form. The distinctive qualities of the tool are (1) the improved character of the surfaces of the cutting and chip forming and directing surfaces of the tool and (2) the increased ability to clear the chip in the case of a restricted chip passageway such as the flutes of a twist drill, reamer, tap, or like tool with a restricted chip directing passage.

5 Claims, 7 Drawing Figures

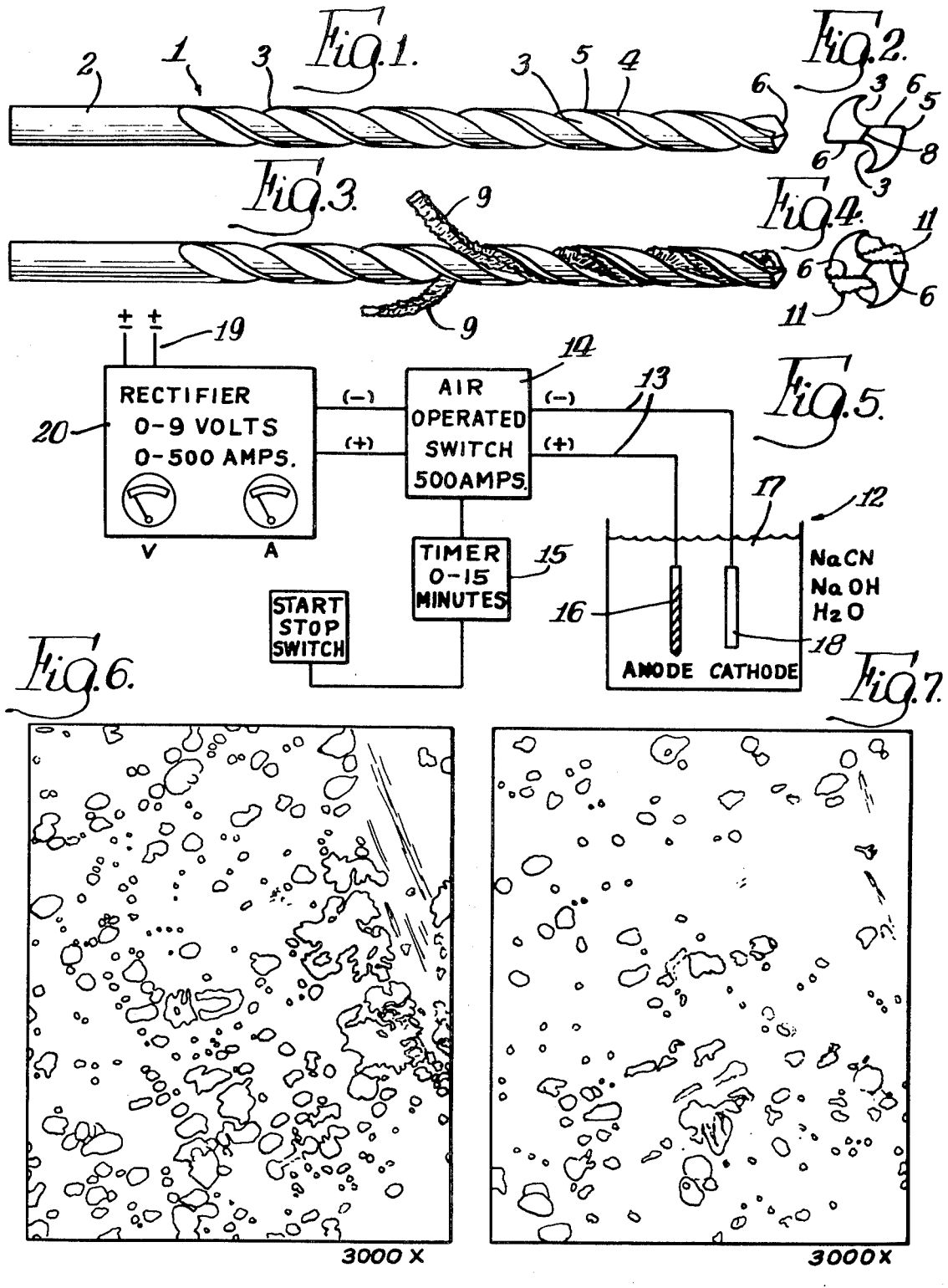

HIGH SPEED STEEL METAL CUTTING TOOL WITH INTEGRAL WORKING SURFACES SUBSTANTIALLY FREE OF CARBIDE PARTICLES

This is a divisional application of my copending application entitled "Surface Treatment of High Speed Cutting Tools and the product Thereof," Ser. No. 177,338, filed Sept. 2, 1971 now U.S. Pat. No. 3,767,544 of Oct. 23, 1973.

BACKGROUND OF THE INVENTION

The use of high speed steel for metal cutting tools is known and has been developed to a high degree of utility for metal cutting operations generally. The material which is known as high speed steel, or high speed tool steel, is characterized by an iron-carbon base with the additional alloying ingredients known as "carbide formers." High speed steels are of two main types, (1) those having molybdenum as the chief alloying ingredient and (2) those having tungsten as the chief alloying ingredient. Additional alloying metals in lesser percentages are added to produce tool steels suitable for particular jobs of metal cutting.

The physical characteristics of high speed steels that adapt them to metal cutting operations are well known and include a high degree of hardness which is retained under increase of temperature to red heat, together with recovery of hardness upon cooling to normal. These steels are tough and hold an edge in a manner superior to carbon steels. The composition of high speed steels is selected for particular services over a wide range of components and proportions. The composition of iron-carbon and alloying metals known as carbide formers results in a very hard metal structure of grains of metal alloy and carbides. The carbides are essential parts of the high speed steel and appear distributed throughout the body of the iron-carbon alloy composition as grains or particles of microscopic size. They appear to pervade the body of the alloy in a more or less uniformly distributed fashion, and at the surface of the high speed steel are revealed as particles of generally microscopic size visible under the electron microscope. These carbide particles exposed or partly exposed on the surface, as we have found, create friction of the high speed steel tool with the workpiece. The mass of the high speed tool steel is pervaded throughout by these minute carbide grains and they appear on or at the surface in profusion. Cutting tools, particularly twist drills and the like, are ground to final shape and dimensions. These particles remain in exposed position.

THE PRIOR ART

The prior art has been aware of the unsatisfactory character of high speed steel cutting and chip forming and directing surfaces which produce undesirable effects in metal cutting tools generally, and in very considerable degree in such metal cutting tools as twist drills where the chip does not have unrestricted release upon severance from the workpiece. In the use of twist drills of high speed steel operating to drill holes into soft, tough metal such as aluminum, mild steel, copper and certain alloys, the effect of the presence of these exposed carbides is to limit the number of holes of a given depth which a drill will be able to cut. Metal working tools in which the chip must leave the region of the cutting edge in a restricted path present the severest test, particularly in drilling deep holes in relatively soft but tough metals. The drill tends to stick in the hole and break.

The prior art has been aware that high speed steels include carbides as an essential part of the composition of the alloy. These carbides appear throughout the entire body of the high speed steel tool and some are exposed on the chip forming surface of the cutting tool and on the cutting edge thereof. They are of microscopic size and can be seen only through the electron microscope. An illustration of the appearance of the sruface of a sample of high speed steel under the electron microscope appears in the metals Handbook, Eighth Edition, Vol. 1, page 246, which exhibits a photomicrograph at X-1000 of the surface of high speed steel exhibiting carbide grains exposed at the surface of the metal. (Also see page 682 of said publication).

The art has attempted to overcome the unfavorable surface conditions presented by the exposed carbide grains, generally by masking them as is explained in the slender volume published by A.S.T.M.E., American Society of Tool and Manufacturing Tool Engineers, 1968, pages 48–61. This review of the various methods made to avoid the adverse effects of the abrasive surface of high speed tool steel explains the numerous and varied attempts of the art to overcome the difficulty. These methods generally comprise steam oxidizing, chromium plating, etc., all of which did not get to the root of the trouble. Putting a covering layer over the offending surface is an unsatisfactory expedient because under the tough conditions of usage, the added surface layer will break down and separate.

COMPANION PROCESS APPLICATION

The successful treatment of the surface of high speed tool steel for various metal cutting operations which is disclosed in our copending U.S. Pat. No. 3,767,544, comprises removal of those carbides which are exposed, to the extent that they can be successfully attacked and dissolved, on the surface or even when partially exposed. In the latter case, the removal of the carbide particle which is partially exposed leaves a depression with rounded rims. Removal of the carbide particles from the surface of the high speed steel metal leaves a thin overall layer of metal substantially free of carbides which presents entirely different physical properties and coefficients of friction, both for the cutting operation and for the chip forming and/or removal function.

SUMMARY OF THE INVENTION

The present invention is a high speed steel metal cutting tool from the work and or/chip-engaging surfaces of which the carbide particles, that project from or are exposed at the working surfaces of the tool, have been removed. The specific tool selected to illustrate the preferred embodiment of the invention is a high speed steel twist drill of known shape. Other forms of high speed steel tools, as defined in the apended claims, may embody the same invention and gain the same benefits and advantages in greater or less degree.

THE SCOPE OF THE INVENTION

The scope of the invention is defined by the appended claims. An explanation of the utility of the concept of removal of the carbide particles from the working surfaces of high speed steel metal cutting tools is as wide as the area in which high speed metal cutting tools are employed.

It is in connection with the use of twist drills required to drill deep holes of small as well as larger diameter in soft, gummy metals that the present invention shows its superiority over drills of a similar form and made of high speed steel treated according to known methods in the art.

The process employed to produce a tool of the present invention involves subjecting the tool—such as a steel twist drill—after grinding to finished size and cleaning the surface, to electrolysis in an electrolytic cell with an aqueous solution of sodium hydroxide and sodium cyanide in substantially equal proportions wherein the tool serves as an anode in the bath. The electrolytic treatment levels off the ridges and grooves left by the finish grinding and also removes from the surface of the metal the multitude of tiny carbide particles that are present in great numbers per unit area. In this microscopicly thin modified layer, tiny holes remain exactly where the carbide particles were formerly located. Under the influence of the electrolytic action, it appears that the sodium hydroxide attacks and dissolves the exposed surface carbides, while the sodium cyanide etches the metal matrix in which these carbides are embedded. Time in this electrolytic bath is a factor. The longer the time the greater the depth of action on the tool. More metal matrix would be etched away exposing more tiny carbide particles that would be dissolved. Ultimately the tool would be destroyed for useful purposes. Under ideal conditions timing would be adjusted so that actually only those tiny particles exposed on the surface of the finished ground tool would be dissolved, thus forming the desired modified surface layer. The treatment generally reveals lines that appear to be grain-like boundaries in the metal matrix. There is question as to whether these lines actually are grain boundaries, as known in the art of metallurgy. All of these conditions above related are as observed under scanning electron beam microscopy.

Comparison of drills prepared in accordance with the surface treatment of the prior art with drills treated to produce the surface conditions of the drills of the present invention shows that the drills of the present invention, treated in accordance with the process described below, have a much longer working life than drills treated according to processes of the prior art. This extended life more than pays for the cost of the treatment required for production of drills of the present invention.

The process to which the drills of the present invention are subjected produces a novel surface on the cutting tool and produces a lubricative anti-weld and anti-friction property of the treated surface of the tool. This reduces the buildup and galling of the cutting edge and chipengaging face of the tool resulting in lower cutting temperature and longer cutting life. The production of the tool of the present invention does not deposit any additive material on the cutting tool surface but permanently transforms the surface of the substance of the tool itself, excluding the carbides, thereby removing the possibility of peeling or flaking or deterioration due to coolants and chemicals. The superiority of drills of the present invention over the prior art shows up also in drilling harder materials such as stainless steel and even the abrasive and hard material cast iron.

The requirements of the drill as a metal cutting tool find parallel requirements in other metal cutting tools such as thread-cutting taps, reamers, and milling cutters, combined drill and countersink and the like. This is true particularly in those cases where the buildup of material on the cutting edge interferes with clean sharp cutting and free flowing chip removal under heavy duty cutting of the workpiece by the tool.

OBJECTS OF THE INVENTION

The object of the invention is to provide a high speed steel metal cutting tool which has its cutting edge and/or chip-engaging and/or chip-directing surfaces substantially freed, or effectively freed, of carbide particles whereby to improve the efficiency and effective life of the tool.

A further object of the invention is to reduce the buildup of material upon the cutting edge of the tool of the present invention.

A further object is to reduce the abrading effect of the chip upon the face and chip passageways of the tool.

A further object is to provide a tool of the character described in which there is a minimum buildup of high temperature on the face and cutting edge of the tool of the present invention.

Now in order to acquaint those skilled in the art how to construct and utilize the invention, we shall describe a specific embodiment of the invention in the form of a twist drill and the process of producing the same. A description of the method of producing a novel high speed steel twist drill is here given to enable those skilled in the art to practice the present invention of a high speed steel metal cutting tool.

DESCRIPTION OF THE DRAWING

FIG. 1 is a side elevational view of a high speed steel twist drill of known form but which has received the surface treatment which provides the present invention; it is slightly gray in appearance.

FIG. 2 is an end view of the drill of FIG. 1 on an enlarged scale taken from the right of FIG. 1; FIGS. 1 and 2 show the appearance of the drill after drilling a predetermined number of holes through an aluminum test block.

FIG. 3 is a side elevation of a drill of the same size and form as that of FIG. 1 but without having received the surface treatment which provides the present invention; this shows the condition of the untreated drill after completing only a part of the predetermined number of holes through the aforesaid aluminum test block having the chips welded at their inner ends to the cutting edges on the point of the drill, said chips lying partly within the flutes of the drill and extending outside the flutes beyond the hole drilled.

FIG. 4 is an end elevation on an enlarged scale of the drill and chips of FIG. 3 taken from the right of FIG. 3.

FIG. 5 is a circuit diagram of an electrolytic cell and power supply for applying the surface treatment of the invention to produce drills of the invention.

FIG. 6 is a plan view at 3000X of a small area of the flute surface of a twist drill of the same form and composition as the drill of FIG. 1 prior to the application of the electrolytic treatment of the invention. The purpose is to show the typical distribution of the tiny carbide particles on the working surface of the twist drill.

In order to do this the matrix was slightly etched away to expose these carbide particles. The sktech was made from a scanning electron beam microscopic photograph.

FIG. 7 is a plan view at 3000X of the same area as that shown in FIG. 6 after the same surface, shown in FIG. 6, has been treated by the process of the invention. This sketch was also made from a photograph under the same circumstances as explained for FIG. 6; note that we now have tiny holes instead of carbide particles, that the layout pattern is the same as in FIG. 6 and the size and shape of the holes matches those of the carbide particles shown in FIG. 6. If the time of treatment described in the invention had been extended on the sample shown in FIG. 6 the pattern shown in FIG. 7 would have been obliterated since more of the matrix would have been etched away, more carbide particles exposed and dissolved by the treatment. Removal of the carbide particles leaves a layer of metal on the surface (shown in FIG. 7) of alloy metal which has a lower coefficient of friction with the workpiece and the chip than does the untreated surface shown in FIG. 6.

DESCRIPTION OF THE PREFERRED EMBODIMENT

The development of metal cutting tools has been under intensive study during the last 50 years. This is due to the economic pressure for greater machine output.

Primary development along this line has been made in the composition of high speed cutting steels for cutting various metals or compositions of metals. These steels generally include in their analyses iron and carbon and certain metallic alloying constituents which add greatly to the life of the resultant tool.

These improved alloy cutting steels employ various proportions of molybdenum, chromium, vanadium, tungsten, and cobalt, usually with either molybdenum or tungsten as the predominent alloy constituent. These alloy constituents are frequently referred to as carbide formers.

Those skilled in the art of cutting tools designate, under the term "high speed steel", steel analyses containing various alloying metals in various proportions to provide particular qualities and capabilities.

A metal cutting operation involves the movement of a tool, having a cutting edge, relative to a workpiece to sever a chip from the workpiece, which chip has movement along the rake face of the tool, there being a clearance between the bottom of the tool and the face of the workpiece by what is known as the relief angle. This mechanism is common to all metal cutting tools whose function is chip removal from the workpiece.

The specific embodiment herein illustrated and described in detail is a high speed metal cutting twist drill of the form illustrated in FIG. 1 having a cutting and chip-engaging surface of the character illustrated in FIG. 7. This drill, as an example, is made of high speed steel of the molybdenum type, designated in the art by the symbol M-7, and comprising carbon and the alloying elements of molybdenum 8¾ percent, chromium 4 percent, vanadium 2 percent, and tungstne 1¾ percent. The invention is not confined to a specific formula for the composition of the steel. Another typical composition frequently employed in the manufacture of drills is a steel alloy having a composition designated in the art by the symbol M-2. The invention is not to be confined to twist drills but is applicable to high speed steel cutting tools generally, which encounter the same problem, but perhaps in somewhat less degree than the twist drill.

As shown in FIG. 1 the twist drill 1 has a straight shank 2 at the mounting end, and helical flutes 3—in this case two in number. These flutes have been ground into the body of the cylindrical blank from which the drill is made, after hardening. Between the flutes are the helical lands 4 upon the leading edges of which there are so-called margins 5 which at the cutting edges 6—6 extend to the full diameter of the drill and determine its effective diameter of cut. At the point end of the web, which is the thinnest part of the drill, there is the so-called chisel edge 8. In the operation of the drill the chisel edge 8 is forced into the metal to bring the cutting edges of lips 6—6 into play and the said cutting edges or lips sever the chips, one in each flute. Said flutes in normal operation of the drill conduct the chips either as continuous wirelike pieces, as shown in FIG. 3 at 9, or as fragments which travel up through the flutes to the outside of the hole which the drill has formed.

At the bottom of the hole which the drill is forming, the cutting edges or lips 6 sever material from the workpiece, and the chip from each cutting edge is forced to move upwardly through the flutes 3—3 to the outside of the hole. The material from the workpiece which goes to form the chip must make a sharp rising movement against the face of the flute immediately adjacent to the lip, and it is at this point that the major part of the work of the drill is done. Metal from the workpiece is severed and raised to form the chip and where the friction of the chip on the edge and on the face of the flute is excessive the temperature will rise, sometimes to approximately the melting point of the material of the workpiece, particularly in the case of soft, gummy metals such as aluminum and copper. The material from the workpiece tends to form a buildup or deposit 11 on the cutting edge of the lip 6 and becomes welded to it. As this deposit 11 builds up, the efficiency of the drill is lowered and the friction of the drill in the hole becomes so great as to result either in the drill no longer cutting and becoming ineffective or in actual breakage of the drill.

The prior art is aware that the resistance to chip formation and chip removal from a cutting tool such as a drill may be facilitated by surface treatment of the cutting tool. Such known treatments include surface oxidation of the drill in a steam atmosphere to give a black oxide coating to the treated surfaces. Another expedient is chromium plating of the working surfaces of the drill. Both of these methods improve the life of the drill in some degree.

Practically the only surface treatment of the prior art which improves drill performance sufficiently to pay its cost is the steam oxide treatment which gives the drill a coating of black oxide.

We have discovered that the serviceability and life of high speed steel twist drills and similar cutting tools may be greatly improved by an electrolytic surface treatment of the high speed steel which removes the surface layer of tiny carbide particles as they originally appear on the working surface.

Drills made of high speed steel are, according to the present invention, subjected to the electrolytic treatment diagrammatically illustrated in FIG. 5. The electrolytic cell 12 is supplied with direct current over the conductors 13 through the air operated switch 14 capable of interrupting heavy currents of the order of 500 amperes for a commercial installation. The switch 14 is controlled by a timer 15 which is set to predetermined time for the electrolytic treatment of the drill 16 as an anode in the electrolytic bath 17 consisting of sodium cyanide and sodium hydroxide in substantially equal proportions by weight dissolved in water to make up an electrolyte at a Baume gravity of from 16°–17° in a newly prepared solution. The cathode 18 is a bar of mild steel.

Power may be supplied over leads 19 connected to a commercial source of alternating current which supplies the rectifier 20 with power to deliver direct current at a voltage of 9 volts and up to 500 amperes for treatment of a multiplicity of drills at the same time. Instead of the single drill shown as subjected to the treatment, we may treat a batch of drills by using a tumbling barrel with insulated conductors terminating in steel anodes exposed on the inside of the barrel to contact the drills in the electrolytic bath. The anodes keep contact with the drills as they are tumbled to maintain the electrolytic treatment while the drills change position for more nearly uniform effect of the electrolytic action upon them. Ordinarily the tumbling barrel is satisfactory to treat drills in diameters from ⅛ through ½ inch in lots of the same size providing the number of pieces in the lot is of sufficient quantity.

For treatment of drills smaller than ⅛ inch in diameter a channel type magnetic rack is used to hold the drills in position, the direct current passing through the magnetic holding device.

Drills larger than ½ inch are held during treatment in a mechanical type rack and the electrical connection made by means of large alligator clips. At times it is necessary to treat smaller quantities of drills in sizes from ⅛ through ½ inch than would be suitable for handling in the tumbling barrel and these smaller quantities are treated in the same type racks and in the same manner as described for the larger drills.

The electrolytic treatment of the invention leaves the surface of the drill with a light gray color which makes the drill so treated readily distinguishable from the drill with "bright finish" produced by the conventional grinding operations ordinarily used to grind drills to final dimensions followed by a polishing treatment which smooths out the marks of the abrasive.

We have run comparative tests, on the same workpiece and under the same operating conditions, of twist drills made of high speed steel and surface treated according to the present invention and twist drills of the same high speed steel, surface treated in accordance with the practices of the prior art, to compare efficacy of the prior art surface treatments with that of the present invention. Such tests have shown that the surface treatment of the present invention produced cutting tools—more specifically twist drills—substantially superior in performance to similar twist drills treated in accordance with the teachings of the prior art. This superiority is great enough to make the treatment economically feasible.

We submit below a test report comparing drills prepared in accordance with the present invetion with those prepared in accordance with the prior art in connection with the drilling of holes in mold steel. The material through which the drills operated was a plate of mild steel 1 inch thick which called for the drilling of a "deep hole," since a deep hole is generally regarded as one which is four or more drill diameters deep.

Drills Tested 3 drills No. 7 (0.2010 inch dia.) General purpose Jobbers Drills "Vermont" Style D–300 bright finish, no surface treatment.

3 drills same as above except steam oxidized.

3 drills same as first group except surface treated according to the present process.

Test Material 1 inch thick mild steel: 149–156 Brinnel Hardness Number

Speed 2,850 R.P.M.; 150 surface feet per minute

Feed 0.0047 inch/rev., 13.4 inch penetration per minute

Coolant

Soluble Oil Emulsion

Purpose of Test

To compare the performance of drills of the present invention with the performance of surface treated drills of the prior art, the test being run on a material (mild steel) widely encountered in drill operations.

Results of Test

| Drill Nos. | No. of Holes | Total | Performance % |
|---|---|---|---|
| No. 1 - Bright Finish | 1870 | | |
| No. 2 - Bright Finish | 1634 | | |
| No. 3 - Bright Finish | 1946 | 5450 | 100% |
| No. 4 - Steam Oxide | 2231 | | |
| No. 5 - Steam Oxide | 2410 | | |
| No. 6 - Steam Oxide | 2376 | 7017 | 130% |
| No. 7 - "Test"* | 2764 | | |
| No. 8 - "Test"* | 2980 | | |
| No. 9 - "Test"* | 2891 | 8635 | 158% |

*Drills of the present invention

While the above test shown that drills, surface treated by steam oxide treatment, will out-perform bright finished drills having no surface treatment, by 30 percent, drills treated in accordance with the present invention give almost twice the increase in performance of drills having steam oxide surface treatment on mild steel.

In connection with the drilling of soft, gummy metals such as aluminum, copper, titanium and some of the stainless steels as well as other metals and their alloys, the superiority of drills of the present invention over drills treated in accordance with the prior art is much greater. In the drilling of aluminum and the like, the material from the workpiece welds onto the cutting edge of the drill and builds up in the flutes destroying the efficiency of the drill as a cutting tool. The chip, instead of showing a clean cut surface, resembles more nearly a drawn wire which continues on from the cutting edge through the corresponding flute and out of the hole.

The variables of current density, temperature, concentration of solution, and time are not found to be too critical but nevertheless should be controlled between certain limits.

Current Density

The current density generally runs approximately 0.5 to 2.0 amperes per square inch of the parts being treated. A lesser current density and a longer time would accomplish similar results. In practice the total direct current amperes into the bath generally remain constant and the time in the bath is used for control.

Temperature

The bath is maintained between 125° and 145°F. by an electrical heater in the bath and thermostatic control, normally the bath is kept between 135° and 140°F.

Concentration of Solution

The new solution is made up with 12–15 ounces of sodium hydroxide and 16–20 ounces of sodium cyanide per gallon of water. Baume runs 16°–17° for the new solution but as weeks of use pass by gradually rises to around 31° and then tends to level off. The concentration of both chemicals in the bath is periodically maintained by the addition of chemicals as required based upon conventional chemical analysis.

Time

The time varies between 3 to 10 minuted depending on the total weight and the surface area versus unit weight relationship of the particular type tools being treated. For example, with a total of 200 direct current amperes going through the bath and load, a light load of ⅛ inch drills in the tumbling barrel might require 3 minutes and a large load of the same drills 10 minutes to complete the treatment.

Surface color provides a fair indication for the extent of the treatment. A light gray color is desired. Darker gray indicated overtreatment which generally means that etching has progressed beyond just the surface layer and that carbide particles further down into the tool have also been removed, all of which is undesirable.

Test runs comparing the drill of the present invention with the drills prepared by surface treatment in accordance with the prior art show improvement in the drills of this invention in the number of holes drilled, generally in the range of from 2 to 4 times as many holes drilled by drills of the present invention as by drills prepared in accordance with the prior art. The improvement shown in the specific test above reported is in about the lowermost range of improvements shown by tests on various metals which we have conducted.

We claim:

1. A metal cutting tool having a body composed of high speed tool steel comprising carbide particles of minute size dispersed through said body, said body having working surface portions comprising a cutting edge portion and an integral chip-raising surface portion extending from the cutting edge portion, said cutting edge portion being adapted to sever a chip from a metal workpiece, and the chip-raising surface portion being adapted to raise the severed chip from the workpiece, said cutting edge portion and said chip-raising surface portion both being parts of the body off the tool and containing distributed carbide particles and having their abovesaid working surface portions substantially free of exposed carbide particles.

2. A twist drill comprising a substantially cylindrical body with longitudinally extending spiral flutes separated by a web and terminating at the working end in approximately conical cutting lips joined by a chisel edge, the entire body being formed of high speed steel which contains minute carbide particles distributed throughout said body below the surface of the same, said carbide particles being separated from the cutting and chip-engaging surfaces by an integral layer of high speed steel which is substantially free of carbide particles.

3. A twist drill comprising a generally cylindrical body of high speed steel provided with helical flutes, with a web between them, and terminating in cutting lips and a point, said drill comprising a body of high speed steel alloy of iron, carbon, and carbide-forming metals, said body containing minute carbide particles distributed throughout the body with an integral surface layer of steel from which carbide particles have been substantially eliminated.

4. The twist drill of claim 2 wherein the body of high speed steel is of the molybdenum type.

5. The twist drill of claim 2 wherein the body of high speed steel is of the tungsten type.

* * * * *